J. S. CAMPBELL.
Hose Carriage.

No. 231,399.    Patented Aug. 24, 1880.

Attest:
W. F. Hower
Edwin Bonneau

Inventor.
J. S. Campbell, per
Thos. S. Crane, Atty.

UNITED STATES PATENT OFFICE.

JOHN S. CAMPBELL, OF PLAINFIELD, NEW JERSEY.

HOSE-CARRIAGE.

SPECIFICATION forming part of Letters Patent No. 231,399, dated August 24, 1880.

Application filed January 24, 1880.

*To all whom it may concern:*

Be it known that I, JOHN S. CAMPBELL, of Plainfield, in the county of Union and State of New Jersey, have invented a new and useful Improvement in Hose-Carriages, of which the following is a specification.

My invention relates to an improvement in hose reels or carriages; and it consists in an improved method of mounting the reel and running-gear upon the same axle, in improved means for disconnecting the reel from the running-gear when unwinding the hose, and in improved means for laying the hose upon the reel automatically.

My invention is designed to furnish an automatic or self-winding hose-reel of the simplest construction, and it is so constructed as to take up the hose from the ground when the reel is pushed toward the hose, to wind it upon the reel, and to guide it regularly from one end of the reel to the other as the hose is wound in. The laying-guide is also constructed to return to its initial position automatically when the hose is unwound from the reel, and the running-gear is automatically disconnected from the reel when the hose is wound in and the carriage is moved from place to place.

I am aware that operations similar to these have been performed by other mechanism, and I do not therefore claim as new the winding or unwinding of the hose at the same rate as the carriage is moved over the ground, nor the laying of the same upon the reel in regular coils; but, as I have accomplished these objects in an especially simple manner, I consider that my improvement consists in the construction and operation of the mechanism herein set forth.

Figure 1:
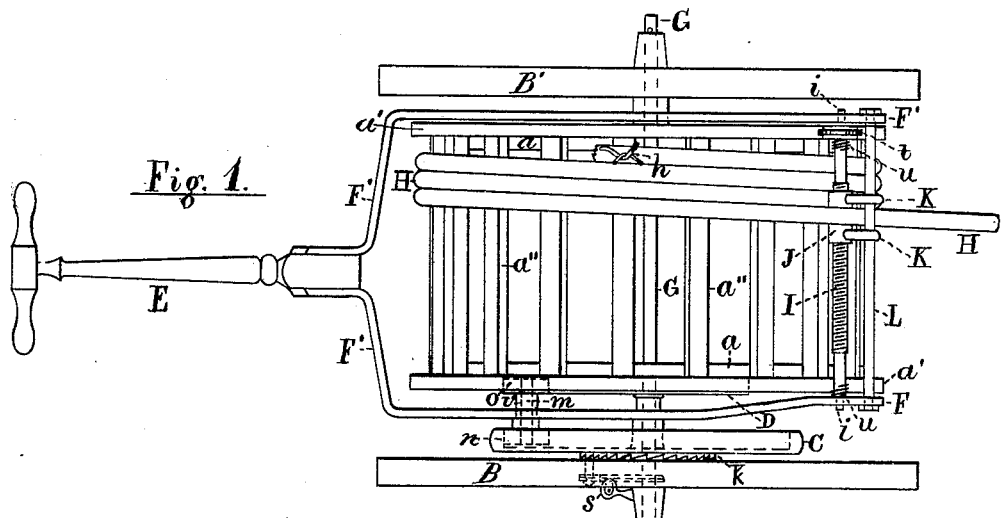
Figure 2:
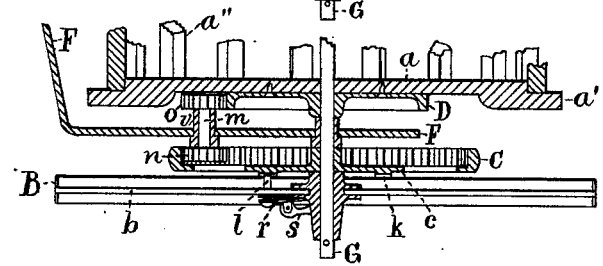
Figure 3:
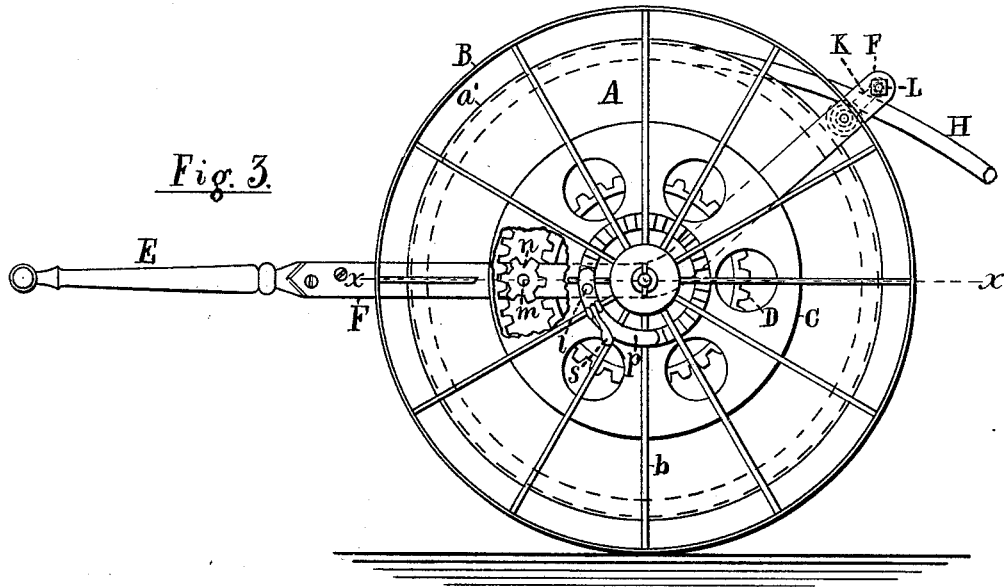

My invention is illustrated in the accompanying drawings by three figures, of which Figure 1 is a plan. Fig. 2 is a section on line $xx$ in Fig. 3, showing, in plan, the driving-gear connecting the running-gear to the reel; and Fig. 3 is a side elevation of the entire machine, a portion of the first driving-gear being broken away to show the construction more clearly.

A is the reel, $a\ a$ its heads, and $a''\ a''$ are staves connecting the heads. $a'\ a'$ are flanges at the ends of reel to retain the hose; B B', the running-gear, consisting of two wheels secured at the ends of the axle by nuts or linch-pins; C, the first cog-wheel, driven by or connected to wheel B; D, the reel cog-wheel, attached to one of the heads $a$; E, the handle for propelling the entire machine; F F', arms attached to the handle and extended past each end of the reel to the axle, to which they are secured; G, the axle, common to the reel and running and driving gears; H, the hose; I, a screw to operate the hose-laying guide; J, nut on screw I; K, guide attached to nut J; L, tie-rod connecting outer ends of arms F F', which are extended beyond reel to carry screw I; $b\ b$, spokes of wheels B; $c$, plate of gear or cog wheel C; $h$, attachment of hose to reel; $i\ i$, bearings of screw I in arms F F'; $v$, bearing on arm F for shaft $m$; $k$, ratchet-wheel secured to wheel C; $l$, pawl attached to wheel B; $m$, shaft for pinions transmitting motion of running-gear to reel; $n$, pinion driven by cog-wheel C; $o$, pinion driving cog-wheel D; $p$, plate on spokes of wheel B; $r$, spring for pawl $l$; $s$, an eccentric cam on spring $r$ to draw pawl $l$ out of ratchet $k$; $t$, friction-wheel on screw I, driven by contact with flange of reel; $u\ u$, springs at ends of screw I.

The above-described mechanism is so arranged and proportioned that when the hose is lying upon the ground, and the reel is pushed toward it by the handle E, it may wind in the hose at the same rate that the wheels B advance over the ground, the end of the hose being first passed through the guide K and attached to one of the staves $a''$, as at $h$. When thus wound in, the hose-carriage may be pulled in the opposite direction without imparting any motion to the reel at all, as the pawl $l$, which serves to connect the running and the driving gears together, slips idly over the teeth of the ratchet-wheel $k$ when the machine is pulled forward in transporting it from place to place.

If it be desired to unwind the hose when attached to a hydrant, the machine is simply pulled forward, and reel unwinds at the same rate that the driving-gear revolves; but in case the reel is to be turned when the carriage is standing still, the cam $s$ is thrown down against the plate $p$, and the spring-pawl is thereby withdrawn from the teeth of wheel $k$, leaving the reel free to turn in either direction.

The driving-gear for the reel is shown constructed with one cog-wheel connected to the running-gear B and one secured to the reel, the motion being conveyed from one to the other by a small pinion-shaft carried in a bearing upon the arm F, which passes between the reel and wheel B on its way from the handle E to the axle.

Each end of the pinion-shaft has a small pinion on it, which meshes into one of the cog-wheels C and D; and as the wheel C is shown larger than D, and bearing the same ratio to the size of the wheel B that the wheel D does to the reel, the pinions are shown of the same size, to make the reel revolve at the same surface-speed as wheel B.

The wheel C may be rigidly secured to the running-gear B if one of the pinions be provided with a pawl, as is done in similar cases in mowing-machines, the essential point in my device being that the two cog-wheels C and D shall be connected together by a single pinion-shaft mounted upon the arm F, that the utmost simplicity and economy of space may be secured.

The laying-guide K, consisting of a mere socket or fork attached to the nut J, is set at the end of screw I, to correspond with the attachment of the hose to the reel at $h$; and the screw I being driven by a friction-wheel, $t$, as the reel winds in the hose, the guide is carried by nut J across the face of the reel to the other end of the screw, where it comes in contact with a spring resting against the arm F just as the nut runs off the thread of the screw, which is cut short for that purpose at each end of the screw I. The nut, being pressed against the thread of the screw so long as the hose remains on the reel, is in readiness to travel back again whenever the motion of the screw is reversed by the unwinding of the hose from the reel and running off the thread against a spring at its original starting-point. It is also in readiness to carry the guide along the screw whenever the reel is turned to wind in the hose.

It will be seen that with the construction and arrangement specified the several parts act automatically in picking up the hose from the ground when once secured to the reel and in laying it regularly upon the reel, as desired.

By employing the arms F as supports for the pinion-shaft and guide-screw all necessity for framing is avoided, and the direct connection of the reel to the running-gear by a single short shaft, $m$, secures the utmost simplicity and compactness of construction.

I claim—

1. The combination of the wheel B, provided with cog-wheel C, the reel A, provided with cog-wheel D, and the shaft $m$, provided with pinions $n$ and $o$, and mounted in a bearing upon the arm F, in the manner shown and described.

2. In combination with the gears C and D and pinion-shaft $m$, mounted upon arm F in the manner described, a pawl operating to disconnect the running-gear from the reel, substantially as and for the purpose set forth.

3. The laying-guide K, in combination with the nut J and screw I, the latter being driven by the reel A, and having thread-clearances at one or both ends, and a spring or springs to reverse the movement of the nut, as herein set forth.

JOHN S. CAMPBELL.

Witnesses:
EDWIN G. BONNEAU,
THOS. S. CRANE.